(12) United States Patent
Chan et al.

(10) Patent No.: US 8,117,488 B2
(45) Date of Patent: Feb. 14, 2012

(54) CLUSTER NEIGHBORHOOD EVENT ADVISORY

(75) Inventors: Wilson Chan, San Mateo, CA (US);
Angelo Pruscino, Los Altos, CA (US);
Tak Fung Wang, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 294 days.

(21) Appl. No.: 12/605,248

(22) Filed: Oct. 23, 2009

(65) Prior Publication Data
US 2011/0099412 A1    Apr. 28, 2011

(51) Int. Cl.
*G06F 11/00* (2006.01)
*G06F 11/07* (2006.01)
(52) U.S. Cl. .......... 714/4.3; 714/4.11; 714/4.2; 714/4.21
(58) Field of Classification Search ................ 714/4.11, 714/4.2, 4.21, 4.3, 4.4
See application file for complete search history.

(56) References Cited

U.S. PATENT DOCUMENTS

| 4,224,664 | A | * | 9/1980 | Trinchieri | 714/25 |
| 6,415,395 | B1 | * | 7/2002 | Varma et al. | 714/37 |
| 6,636,982 | B1 | * | 10/2003 | Rowlands | 714/4.1 |
| 7,380,177 | B2 | * | 5/2008 | Goin et al. | 714/47.3 |
| 2010/0074144 | A1 | * | 3/2010 | Yao et al. | 370/254 |

* cited by examiner

*Primary Examiner* — Joseph Schell
(74) *Attorney, Agent, or Firm* — Hickman Palermo Truong & Becker LLP

(57) ABSTRACT

Database server instances in a database server cluster broadcast, to other instances in the cluster, information concerning certain problem events. Because each server instance is aware of problems that other server instances are experiencing, each server instance is enabled to make more intelligent decisions regarding the actions that it should perform in response to the problems that the server instance is experiencing. Instead of terminating itself, a server instance might opt to wait for a longer amount of time for an operation to complete. The server instance may do so due to the server instance having received information that indicates that other server instances are experiencing similar problems. Whenever the information received from other server instances makes it appear that a problem is unlikely to be solved in the cluster as a whole by terminating a server instance, that server instance may continue to wait instead of terminating itself.

20 Claims, 2 Drawing Sheets

CLUSTER NEIGHBORHOOD EVENT ADVISORY

FIELD OF THE INVENTION

The present invention relates generally to the sharing of potential problem event information between servers in a server cluster.

BACKGROUND

A "cluster" is the result of "clustering" computing resources together in such a way that they behave like a single resource. Clustering is often used for purposes of parallel processing, load balancing, and fault tolerance. One common example of a cluster is a set of computers, or "nodes," that are configured so that they behave like a single computer. Each computer in the cluster has shared access to a set of resources. A resource is, generally, any item that can be shared by the computers in the cluster. A common example of a resource is a block of memory in which information is stored. The block of memory may be part of a node in the cluster or may be external to the cluster, such as a database block.

A cluster comprises multiple nodes. Each node executes an instance of a server. Each server in a cluster facilitates access to a shared set of resources on behalf of clients of the cluster. One example of a cluster is a database cluster. In a database cluster, each node executes an instance of a database server. Each database server instance facilitates access to a shared database. Among other functions of database management, a database server governs and facilitates access to the database by processing requests by clients to access data in the database.

Sometimes, an operation that a database server instance is performing might be affected by some problem or obstacle or detrimental effect. For example, a server instance might be attempting to perform an input/output (I/O) operation relative to a certain block of data that resides in the database. Due to reasons that are unknown to the server instance, the operation might be taking much longer to return a result than the server instance expects. For example, the server instance might expect that an I/O operation will take no more than 1 minute, but 5 minutes after initiating the I/O operation, the server instance might still be waiting for a result of the I/O operation. The I/O operation might be taking a long time to return a result simply because the database is stored on slower hardware, such as a relatively slow hard disk drive or set of disks. However, the server instance has no way of knowing that this is the reason for the unexpected delay.

For another example, a storage system layer, which is logically situated beneath the database layer in which the database server instances operate, might manage I/O operations in a manner that is completely obscured from the database server instances. In such a configuration, the database server instances might send, to the storage system layer interface, read and write requests, but the database server instances may be unaware of exactly how the storage layer fulfills those requests. In some cases, the storage layer might operate upon a redundant array of independent disks (RAID). The database's data might be distributed among several different disks in the RAID. The storage system layer obscures this fact from the database server instances so that the database server instances are spared from having to determine which of the disks contain data upon which database operations are to be performed. To the database server instances, the RAID appears to be a single device. The storage system layer handles the task of identifying which disks in the RAID contain the data upon which the server instances request operations to be performed.

Under some circumstances, some of the disks in the RAID might be mirrors of other disks in the RAID, such that certain pairs of disks contain duplicate, or redundant, data. This redundancy is often desirable so that the data will have a greater chance of being constantly available despite the potential failure of one or more of the physical disks in the RAID. The database server instances typically will be unaware of this mirroring. Thus, when agents in the storage layer determine that one of the disks in the RAID contains faulty data or has otherwise experienced some failure, the database server instances likely will not be aware of the fact that the storage layer agents are attempting to switch over the performance of an I/O operation from the faulty disk to the mirror of the faulty disk. This switch-over to the mirror may cause the I/O operation to take much longer than normal to return a result. However, the database server instances probably will not have any way of knowing that the atypical delay is due to a switch-over being performed in the storage layer. Under such circumstances, the database server instances can only tell that the I/O operation is not returning a result. The database server instances will not know the reason for this.

Typically, in a database system, the database server instances are configured to wait for a specified amount of time before determining that an I/O operation has failed. For example, each server instance may be configured to wait for 1 minute for a result of an I/O operation to be returned from the storage layer. If 1 minute passes without a result being returned, then the server instance that requested the performance of the operation determines that the operation has failed. This is especially unfortunate under circumstances in which the delay is due to some remedial action (such as a switch-over to a mirror) being performed in the storage layer, which would have been completed if the database server instance had just waited a little while longer than the configured time-out amount.

Introducing a further complication, various different storage layer vendors provide storage equipment that operates at different speeds. The amount of time required by one vendor's RAID to perform a switch-over might differ significantly from the amount of time required by another vendor's RAID to perform such a switch-over. Due to the great variance between different vendors' storage facilities, it is difficult for the designer or administrator of a database cluster to determine precisely how long each server instance should wait for a result of an operation before determining that the operation has timed-out and failed.

In a database cluster, the consequences of determining that an operation has timed-out can be severe. As is mentioned above, multiple server instances in the cluster share access to the same set of disks. Because of this sharing, locking mechanisms are usually implemented in the cluster to ensure that no server instance is able to access data that another server instance is currently modifying. Thus, a particular server instance may, in some cases, obtain a lock on a resource (such as a particular data block in the database) before modifying the data contained in that resource. Depending on the kind of the lock, other server instances might be prevented from accessing (at least in certain ways) the resource while the particular server instance holds the lock on the resource. Under such circumstances, the other server instances are required to wait for the particular server instance to release the lock on the resource before those other server instances can continue their work. Server instances that are waiting for the particular server instance to release a lock are said to be "blocked."

If a server instance process remains blocked for an amount of time that exceeds some specified threshold (e.g., 70 seconds), then monitoring agents in the database system may determine that the server instance has become stuck. In response to determining that a process is stuck in this manner, the monitoring agents attempt to determine the reason why the server instance process is stuck. In some cases, the monitoring agents might be able to resolve the problem by causing the lock for which the server instance is waiting to be released. However, if the monitoring agents determine that the server instance process is stuck while performing a read operation (which should not require the server instance to obtain a lock), then the monitoring agents might not be able to remedy the situation while permitting the server instance process to continue. A complication arises from the possibility that the stuck server instance process might currently be holding locks on other resources—locks for whose release yet other server instances in the cluster are waiting. If the stuck server process is allowed to wait indefinitely, then all of the other server instances will be forced to wait also. This could, in some situations, result in a massive gridlock of the entire database cluster.

In order to prevent such massive gridlock from occurring, under circumstances in which the monitoring agents cannot solve the stuck-server problem by forcing the release of some set of locks (e.g., because the stuck server instance is stuck while performing a read operation that does not require the server instance to obtain a lock), the monitoring agents may instruct the server instance process to terminate itself gracefully. Upon receiving such a termination instruction, the server instance process exits of its own volition and ceases executing. As the server instance process terminates itself, the server instance process also releases the locks that it might be holding on other resources in the database, so that other server instances that are waiting for those locks can finally obtain those locks and continue performing their work.

Unfortunately, even the termination of a server instance process in this manner will sometimes fail to solve the problem that is afflicting the cluster as a whole. If the terminated server instance was unduly delayed only because the storage layer was busy performing a switch-over to a mirror, as discussed above, then other remaining server instances that attempt to access the same data that the terminated server instance was accessing also will become stuck. Assuming that these other server instances experience a similar delay and are handled in the same manner as the previously terminated server instance, each of these other server instances also will be terminated. If the data blocks involved in the switch-over are very popular, such that those data block are often the subject of read operations in the cluster, and if the switch-over operation lasts long enough, then the undesirable result might be the termination of all, or nearly all, of the server instances in the cluster.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
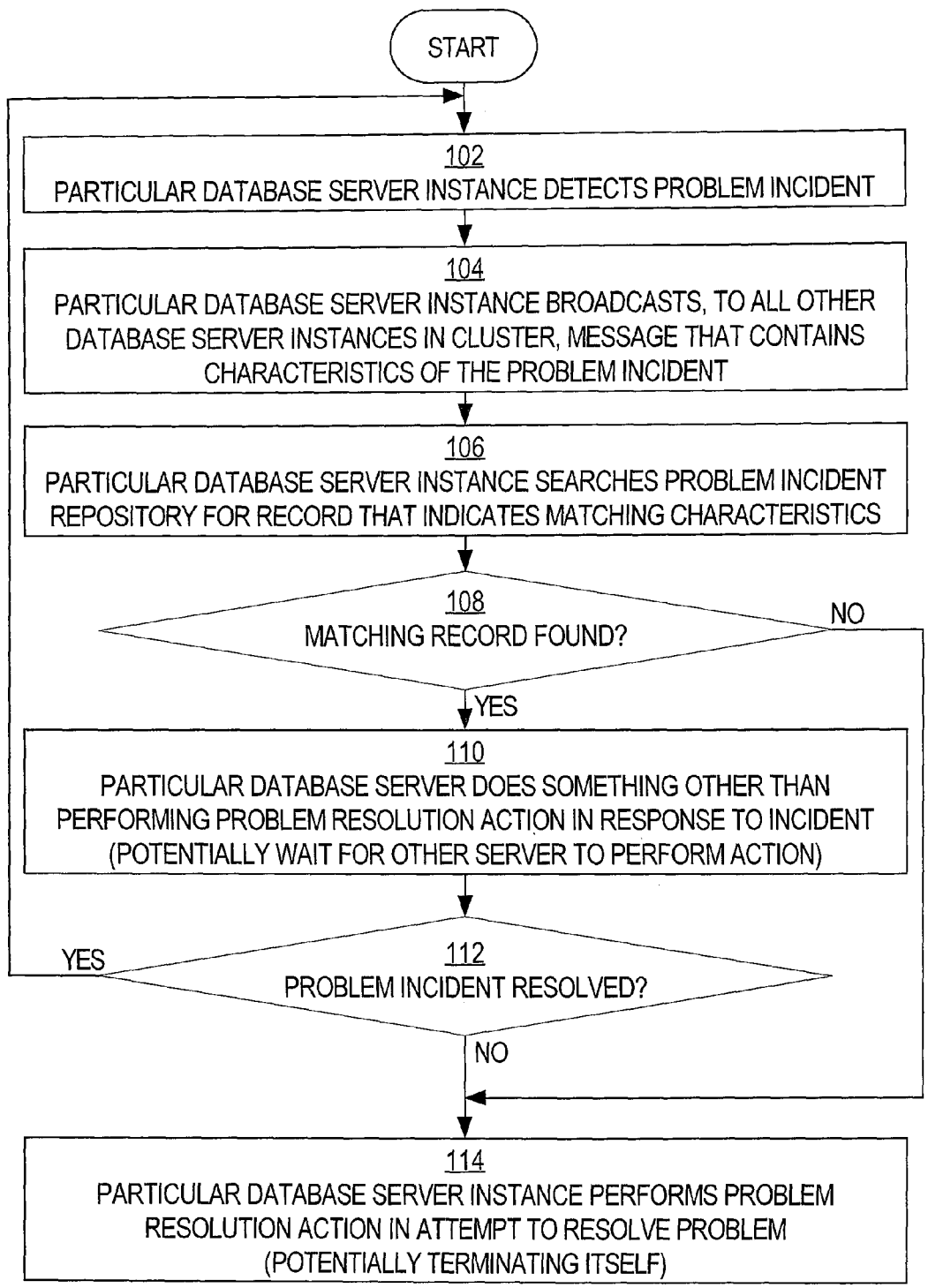
FIG. 1 is a flow diagram that illustrates an example of a technique for checking a cluster problem incident repository before performing a problem resolution action, and for broadcasting information about problem incidents before performing a problem resolution action, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Database server instances in a database server cluster broadcast, to other instances in the cluster, information concerning certain problem events. As a result, all server instances in the cluster are aware of problems that the other server instances are experiencing. Because each server instance is aware of problems that other server instances are experiencing, each server instance is enabled to make more intelligent decisions regarding the actions that it should perform in response to the problems that the server instance itself is experiencing. Instead of terminating itself in response to a problem that it is experiencing, a server instance might opt to wait for a longer than usual amount of time for an operation to return a result. The server instance may opt to wait for this longer amount of time due to the server instance having previously received, from other server instances, information that indicates that the other server instances are experiencing similar problems. Whenever the information received from other server instances makes it appear that a problem is unlikely to be solved in the cluster as a whole by terminating a server instance, that server instance may continue to wait for a problem to resolve instead of terminating itself as the server instance otherwise normally would under the circumstances.

Cluster Environment

An embodiment of the invention may be implemented in an operating environment referred to as a cluster. One type of cluster in which embodiments may be implemented is a database cluster. As previously described, a database cluster comprises multiple nodes that each executes an instance of a database server ("server") that each facilitates access to a shared database. Each node comprises a combination of computing hardware, such as computing system 200 of FIG. 2, and a server instance. Each server instance comprises a combination of integrated software components and an allocation of computational resources (such as memory and processes) for executing the integrated software components on one or more processors of a node, where the combination of the software and computational resources are used to manage a particular common database on behalf of clients of the cluster.

The operating environment includes clients that are communicatively coupled to the cluster of database servers. The database servers are communicatively coupled to the shared database. The clients are applications or programs that cause execution of processes on the database cluster via a network, for example. A client may execute, for example, on a desktop computer or on an application server.

In the context of a database cluster, the database is a repository for storing data and metadata on a persistent memory mechanism, such as a set of hard disks. Such data and metadata may be stored in the database logically, for example, according to relational database constructs, multidimensional database constructs, or a combination of relational and multidimensional database constructs. When a server accesses data from the shared database, it typically copies the data into the volatile memory of the node on which the server is executing. For example, the data is copied into the node's cache memory for manipulation purposes. Another server on another node may subsequently access the data, either from the other node's cache memory or from persistent storage, depending on the database architecture.

Broadcasting Detected Problem Characteristics

According to one embodiment of the invention, whenever a database server instance detects the occurrence of a problem incident, the database server first broadcasts, to all of the other database server instances in the same database server cluster, information about the characteristics of the problem incident. All of the information described above may be broadcast in messages over a network (e.g., a local area network (LAN), wide area network (WAN), or the Internet), for example. The other database server instances in the cluster receive the broadcasted information and store the broadcasted information in a cluster problem incident repository that each of the database server instances separately maintains.

According to one embodiment of the invention, when determining whether to perform a problem resolution action from a pre-defined, specified set of problem resolution actions—in an effort to solve a particular problem incident—a database server instance first checks its cluster problem incident repository to determine whether any other problem incident having similar characteristics is mentioned therein. In response to determining that information about another problem incident having similar characteristics to the particular problem incident exists in the cluster problem incident repository, the database server instance refrains from performing the problem resolution action that the database server instance would normally perform in response to the problem resolution action. Instead of performing that problem resolution action, the database server instance does something else instead.

In one embodiment of the invention, the something else that the database server instance does instead involves waiting for a specified amount of time to see if the particular problem incident resolves itself without any action on the part of the database server instance. In such an embodiment of the invention, if the particular problem incident does not go away by itself after the database server instance has waited for the specified amount of time, then the database server instance proceeds to perform the problem resolution action that the database server instance had previously refrained from performing while waiting. Under such circumstances, the database server instance broadcasts, to the other database server instances in the cluster, its intention to perform the problem resolution action, as is discussed above.

Example Flow

FIG. 1 is a flow diagram that illustrates a process for checking a cluster problem incident repository before performing a problem resolution action, and for broadcasting information about problem incidents before performing a problem resolution action, according to an embodiment of the invention. Although certain steps and operations are shown by way of example in FIG. 1, alternative embodiments of the invention may include steps and operations that are additional to or different from those discussed in the following example. Alternative embodiments of the invention may involve the performance of steps and operations in an order that is different from the order in which those steps and operations are performed in the example below. Furthermore, alternative embodiments of the invention may omit some steps and operations that are discussed in the following example.

In block 102, a particular database server instance detects an occurrence of a particular problem incident. For example, the particular database server instance may detect that a disk I/O operation (e.g., a read or write) is taking longer than a specified threshold amount of time (e.g., 4 minutes). In one embodiment of the invention, the specified threshold amount of time is calculated to be (a) the amount of time that the particular database server instance would normally wait before performing a problem resolution action in an effort to solve the particular problem incident (e.g., 5 minutes), minus (b) some pre-defined, specified delta amount of time (e.g., 1 minute).

In block 104, in response to detecting the particular problem incident, the particular database server instance broadcasts, to all other database server instances in the particular database server instance's cluster, a message that contains information about the particular problem's characteristics. The particular database server instance may broadcast the message by transmitting a multicast message over a network, for example. Such characteristics may include, for example, (a) a time-of-day range (or precise time-of-day) in which the particular problem incident occurred, (b) an identity of a process (e.g., database server instance) that was performing an operation that suffered from the problem that caused the particular problem incident to be produced, (c) an identity of a data structure (e.g., relational database table, database partition, tablespace, disk block, etc.) and/or device (e.g., hard disk drive, redundant array of inexpensive disks (RAID), network interface, etc.) that was the target of such an operation, or upon which the operation was being performed, and/or (d) an error number and/or description of the problem. Additional or alternative information may be contained in the message as well.

In one embodiment of the invention, the message further indicates the problem resolution action (e.g., self-termination) that the particular database server is going to perform if the problem is not resolved within a specified amount of time, and an indication of that specified amount of time (e.g., 1 minute).

In one embodiment of the invention, each message concerning a problem incident that involves a read or write operation includes at least the following characteristic information: (a) an identity of a disk block (e.g., a disk block number), or other data container that is stored on disk, from which the database server instance was attempting to read or to which the database server instance was attempting to write when the record's problem occurred, (b) an identity of a file (e.g., a file name which might include a full path name), at least a portion of whose data was contained in the disk block, from which the database server instance was attempting to read or to which the database server instance was attempting to write when the record's problem occurred, and (c) an amount of time that the database server instance experiencing the record's problem had waited for an operation (e.g., a read or write operation) to complete before broadcasting the message.

In one embodiment of the invention, whenever any database server instance in a cluster receives such a broadcast message, that database server instance creates a problem incident record for the message's reported problem incident in that server instance's cluster problem incident repository. Each such problem incident record contains at least some, or all, of the characteristics information contained in the received message. In one embodiment of the invention, each problem incident record contains a timestamp that indicates the time and date of the record's creation and/or the time and date of the broadcast of the message that caused the record's creation.

In block 106, the particular database server instance searches its problem incident repository for a problem incident record that indicates problem incident characteristics that are similar to, or that "match," characteristics of the particular problem incident. In one embodiment of the invention, the particular problem incident is deemed to "match" a problem incident record, or is deemed to be sufficiently similar to a problem incident record, if a specified quantity or proportion of the particular problem incident's characteristics are the same as, or fit into a same user-defined range as, the characteristics indicated by the problem incident record. Thus, in one embodiment of the invention, the particular problem incident may "match," or be "similar to," a problem described by a problem incident record even if the characteristics of each are not perfectly identical.

In block 108, the particular database server instance determines whether a problem incident record whose characteristics match those of the particular problem incident has been found in the cluster problem incident repository. If a matching record has been found, then control passes to block 110. Alternatively, if no matching record has been found, then control passes to block 114.

In block 110, instead of performing the normal problem resolution action in an effort to solve the particular problem incident, the particular database server instance refrains from performing that problem resolution action, and does something else. In one embodiment of the invention, instead of performing the normal problem resolution action, the particular database server instance waits for a specified amount of time. In one embodiment of the invention, the amount of time for which the particular database server instance waits is based on information contained in the matching problem incident record. As is discussed above, in one embodiment of the invention, each problem incident record may indicate, among other information, an amount of time that the incident-reporting database server plans to wait before performing a problem resolution action. Thus, if, for example, a problem incident record indicates that a database server instance other than the particular database server instance is going to be performing a problem resolution action within a specified amount of time (which may be adjusted based on the record's timestamp), then the particular database server instance may wait for at least that specified amount of time, because the problem might be resolved by the performance of the problem resolution action by the other, incident-reporting database server instance. Under such circumstances, the particular database server instance would not need to perform the normal problem resolution action (which might involve self-termination). Control passes to block 112.

In block 112, after doing the "something else" mentioned in block 110, which potentially involves waiting for the specified amount of time (typically long enough for some other database server instance in the cluster to perform a problem resolution action in an effort to resolve the same problem), the database particular server instance determines whether the particular problem incident has been resolved. For example, if the particular problem incident involved the particular database server instance being made to wait for a longer-than-expected period of time for a read or write operation to complete, then the particular database server may determine whether that read or write operation has completed yet. For example, if the particular problem incident involved the particular database server instance being made to wait for a longer-than-expected period of time for a lock on a critical resource to be release by another database server instance, then the particular database server may determine whether that lock has been released yet; if the other database server instance has performed a problem resolution action by terminating itself, as might indicated as the other database server instance's plan in the matching problem incident record, then that other database server instance probably has released all of its locks before ceasing execution. If the particular problem incident has been resolved, then control passes back to block 102 after the passage of some time, at which another problem incident is detected. If the particular problem incident has not been resolved, then control passes to block 114.

In block 114, assuming either that (a) no matching problem incident record was found in the cluster problem incident repository, or (b) the particular problem incident has not been resolved despite the particular database server's hesitation to perform the normal problem resolution action (e.g., due to waiting), the particular database server instance performs the normal problem resolution action in an effort to solve the particular problem incident. Typically, the problem resolution action that the particular database server instance performs in block 114 is the same problem resolution action that the particular database server instance would have performed in the absence of the technique described above. For example, the problem resolution action might involve the database server instance releasing all of its locks on database resources (e.g., disk blocks or table rows), and then terminating itself by gracefully ceasing execution. This may be in accordance with a planned problem resolution action that was specified in the message that the particular database server instance previously broadcasted to the cluster. Other database server instances in the cluster might be waiting for the particular database server to perform the planned problem resolution action that is indicated in the problem incident records in those other server instances' cluster problem incident repositories.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
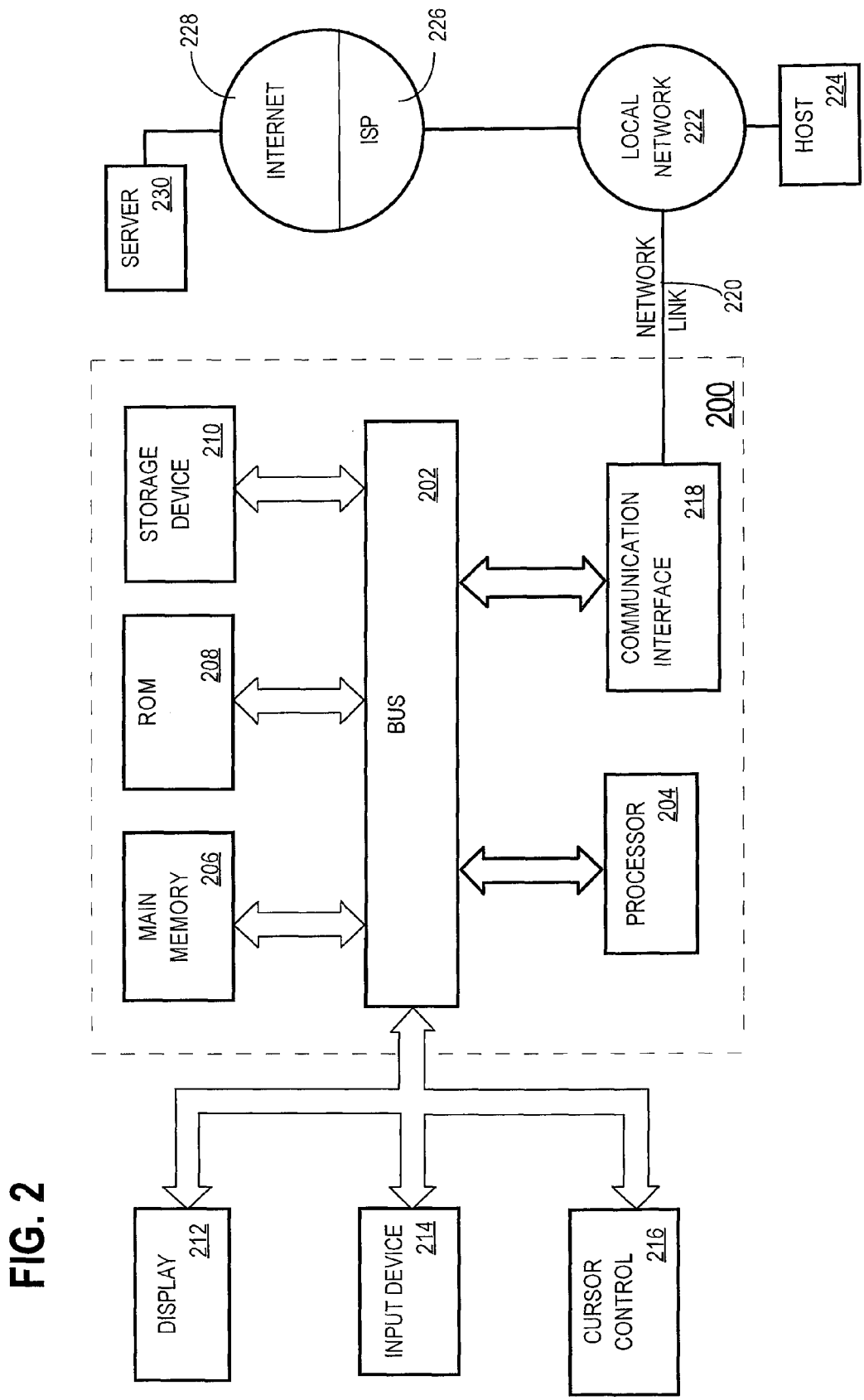
FIG. 2 is a block diagram that illustrates a computer system upon which an embodiment of the invention may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
   a first server instance, in a cluster of server instances, detecting that a problem event, from a specified set of problem events, is occurring relative to an operation that the first server instance is attempting to perform;
   in response to detecting that the problem event is occurring, the first server instance broadcasting, to one or more other server instances in the cluster, first information that indicates characteristics of the problem event;
   the first server instance receiving, from a second server instance in the cluster, second information that indicates characteristics of the problem event; and
   based at least in part on the second information received from the second server instance, the first server instance selecting an action from a set of actions; and
   the first server instance performing the action;
   wherein the set of actions comprises (a) a first action that includes terminating execution of the first server instance and (b) a second action that includes waiting for a specified amount of time, but excludes terminating execution of the first server instance;
   wherein the method is performed by one or more computing devices.

2. The method of claim 1, wherein the first action comprises the first server instance waiting for a specified amount of time, and further comprising:
   the first server instance, after waiting for the specified amount of time, determining whether the problem event has been solved; and
   in response to the first server instance determining that the problem event has not been solved after waiting for the specified amount of time, the first server instance terminating itself.

3. The method of claim 1, wherein the first action comprises the first server instance waiting for a specified amount of time, and further comprising:
   the first server instance, after waiting for the specified amount of time, determining whether the problem event has been solved; and
   in response to the first server instance determining that the problem event has been solved after waiting for the specified amount of time, the first server instance continuing execution without performing the first action in response to the problem event.

4. A computer-implemented method comprising steps of:
   receiving, over a network from a first server, a message that indicates a first problem resolution action that the first server plans to perform;
   in response to receiving the message from the first server, storing a record that indicates the first problem resolution action;
   detecting a problem incident;
   in response to detecting the problem incident, and based on information contained in the record, waiting for the first server to perform the first problem resolution action indicated in the record;
   after waiting for the first server to perform the first problem resolution action, determining whether the problem incident has been solved by the first server's performance of the first problem resolution action; and
   performing a second problem resolution action only in response to determining that the first server's performance of the first problem resolution action did not solve the problem incident;
   wherein the steps are performed by one or more computing devices.

5. The method of claim 4, wherein performing the second problem resolution action comprises terminating execution of a second server that received the message from the first server over the network.

6. The method of claim 4, wherein the first problem resolution action involves the first server terminating its own execution.

7. The method of claim 4, wherein waiting for the first server to perform the first problem resolution action indicated in the record comprises waiting for an amount of time indicated within the record.

8. The method of claim 4, wherein the step of waiting for the first server to perform the first problem resolution action is performed in response to determining that the record indicates characteristics that match characteristics of the detected problem incident.

9. The method of claim 4, wherein the step of waiting for the first server to perform the first problem resolution action is additionally performed in response to determining that the record indicates a time-of-day range into which a time-of-day at which the detected problem incident occurred falls.

10. The method of claim 4, wherein the step of waiting for the first server to perform the first problem resolution action is additionally performed in response to determining that the record indicates at least one of: (a) a data structure that a recipient of the message is waiting to access, (b) a device that the recipient of the message is waiting to access, or (c) an error message of an error experienced by the recipient of the message.

11. A volatile or non-volatile computer-readable storage medium storing instructions which, when executed by one or more processors, cause said one or more processors to perform steps comprising:
   a first server instance, in a cluster of server instances, detecting that a problem event, from a specified set of problem events, is occurring relative to an operation that the first server instance is attempting to perform;
   in response to detecting that the problem event is occurring, the first server instance broadcasting, to one or more other server instances in the cluster, first information that indicates characteristics of the problem event;
   the first server instance receiving, from a second server instance in the cluster, second information that indicates characteristics of the problem event; and
   based at least in part on the second information received from the second server instance, the first server instance selecting an action from a set of actions; and
   the first server instance performing the action;
   wherein the set of actions comprises (a) a first action that includes terminating execution of the first server instance and (b) a second action that includes waiting for a specified amount of time, but excludes terminating execution of the first server instance.

12. The computer-readable storage medium of claim 11, wherein the first action comprises the first server instance waiting for a specified amount of time, and further comprising:
   the first server instance, after waiting for the specified amount of time, determining whether the problem event has been solved; and in response to the first server instance determining that the problem event has not been solved after waiting for the specified amount of time, the first server instance terminating itself.

13. The computer-readable storage medium of claim 11, wherein the first action comprises the first server instance waiting for a specified amount of time, and further comprising:

the first server instance, after waiting for the specified amount of time, determining whether the problem event has been solved; and in response to the first server instance determining that the problem event has been solved after waiting for the specified amount of time, the first server instance continuing execution without performing the first action in response to the problem event.

14. A volatile or non-volatile computer-readable storage medium storing instructions which, when executed by one or more processors, cause said one or more processors to perform steps comprising:

receiving, over a network from a first server, a message that indicates a first problem resolution action that the first server plans to perform;

in response to receiving the message from the first server, storing a record that indicates the first problem resolution action;

detecting a problem incident;

in response to detecting the problem incident, and based on information contained in the record, waiting for the first server to perform the first problem resolution action indicated in the record;

after waiting for the first server to perform the first problem resolution action, determining whether the problem incident has been solved by the first server's performance of the first problem resolution action; and performing a second problem resolution action only in response to determining that the first server's performance of the first problem resolution action did not solve the problem incident.

15. The computer-readable storage medium of claim 14, wherein performing the second problem resolution action comprises terminating execution of a second server that received the message from the first server over the network.

16. The computer-readable storage medium of claim 14, wherein the first problem resolution action involves the first server terminating its own execution.

17. The computer-readable storage medium of claim 14, wherein waiting for the first server to perform the first problem resolution action indicated in the record comprises waiting for an amount of time indicated within the record.

18. The computer-readable storage medium of claim 14, wherein the step of waiting for the first server to perform the first problem resolution action is performed in response to determining that the record indicates characteristics that match characteristics of the detected problem incident.

19. The computer-readable storage medium of claim 14, wherein the step of waiting for the first server to perform the first problem resolution action is additionally performed in response to determining that the record indicates a time-of-day range into which a time-of-day at which the detected problem incident occurred falls.

20. The computer-readable storage medium of claim 14, wherein the step of waiting for the first server to perform the first problem resolution action is additionally performed in response to determining that the record indicates at least one of: (a) a data structure that a recipient of the message is waiting to access, (b) a device that the recipient of the message is waiting to access, or (c) an error message of an error experienced by the recipient of the message.

* * * * *